US009580925B2

(12) United States Patent
Heikkinen

(10) Patent No.: US 9,580,925 B2
(45) Date of Patent: Feb. 28, 2017

(54) FRANGIBLE GUY WIRE OF AN AIRPORT MAST

(71) Applicant: Exel Composites Oyj, Vantaa (FI)

(72) Inventor: Sami Heikkinen, Joensuu (FI)

(73) Assignee: EXEL COMPOSITES OYJ, Vantaa (FI)

( * ) Notice: Subject to any disclaimer, the term of this patent is extended or adjusted under 35 U.S.C. 154(b) by 0 days.

(21) Appl. No.: 14/719,570

(22) Filed: May 22, 2015

(65) Prior Publication Data
US 2015/0345169 A1 Dec. 3, 2015

(30) Foreign Application Priority Data
May 28, 2014 (FI) ...................................... 20145491

(51) Int. Cl.
*E04H 12/00* (2006.01)
*E04H 12/20* (2006.01)
*F16G 11/00* (2006.01)

(52) U.S. Cl.
CPC ............. *E04H 12/20* (2013.01); *F16G 11/00* (2013.01)

(58) Field of Classification Search
CPC .................................. E04H 12/20; F16G 11/00
USPC ...... 52/98, 99, 146, 148, 149, 166; 248/500, 248/548, 900
See application file for complete search history.

(56) References Cited

U.S. PATENT DOCUMENTS

| 503,048 | A | * | 8/1893 | Jacobs | ..................... F03D 9/001 417/334 |
| 1,630,356 | A | | 5/1927 | Perks | |
| 2,128,030 | A | | 8/1938 | Koleno | |
| 3,402,518 | A | | 9/1968 | Lettunich | |
| 3,605,359 | A | * | 9/1971 | Bader et al. | ............ E04H 12/08 52/116 |
| 3,777,428 | A | * | 12/1973 | Caufield | .................. G08B 5/00 116/63 P |
| 3,926,141 | A | | 12/1975 | Taylor | |
| 4,115,965 | A | | 9/1978 | White | |

(Continued)

FOREIGN PATENT DOCUMENTS

| CA | 1216643 A1 | 1/1987 |
| EP | 1152104 A2 | 11/2001 |
| FR | 459173 A | 10/1913 |

OTHER PUBLICATIONS

Aerodrome Design Manual—Part 6: Frangibility 1st. Ed. Doc 9157-AN/901, International Civil Aviation Organization, 2006. ISBN 92-9194-647-8.[HAETTU May 12, 2014]. Internetosoitteesta: Htip://www.millardtowers.com/assets/pdf/icao/icaoaerodromedesignmanual.pdf.

(Continued)

*Primary Examiner* — Charles A Fox
*Assistant Examiner* — James Buckle, Jr.
(74) *Attorney, Agent, or Firm* — Ladas & Parry LLP

(57) ABSTRACT

A frangible guy wire of an airport mast, which breaks on impact without presenting a hazard or causing critical damage to the object impacting with it. The main part of the length of the guy wire consists of a tube or tubular profile made of composite material, the proportions of the dimensions and materials of which have been selected in such a way that in the event of impact, the tube (4) or tubular profile will break by fracturing, that is, by breaking into pieces. The wall thickness of the tube or tubular profile is selected to be so thin that the desired fracturing is achieved.

6 Claims, 2 Drawing Sheets

(56) References Cited

U.S. PATENT DOCUMENTS

| | | | |
|---|---|---|---|
| 4,800,690 A * | 1/1989 | Bunce | E04H 12/20 110/184 |
| 5,529,276 A | 6/1996 | Szablya | |
| 6,245,991 B1 | 6/2001 | Ryan | |
| 6,382,583 B1 * | 5/2002 | Hill, III | E01F 9/0182 174/40 TD |
| 6,397,545 B1 | 6/2002 | Fanucci et al. | |
| 6,655,097 B1 * | 12/2003 | Poolaw | E04H 12/20 248/188.1 |
| 7,097,154 B2 * | 8/2006 | Stevens | B25B 25/00 174/40 TD |
| 7,938,384 B2 * | 5/2011 | Stevens | E04H 12/20 174/40 TD |
| 8,919,051 B1 * | 12/2014 | Echemendia | F03D 11/04 343/874 |
| 9,032,674 B2 * | 5/2015 | Schibsbye | F03D 11/04 52/146 |
| 2011/0016804 A1 * | 1/2011 | Howard | E04H 12/34 52/146 |
| 2011/0168489 A1 * | 7/2011 | Grome | E04H 7/065 182/9 |
| 2015/0152619 A1 * | 6/2015 | Clements | E02D 5/808 52/146 |

OTHER PUBLICATIONS

FR 459173 A Machine Translation.

\* cited by examiner

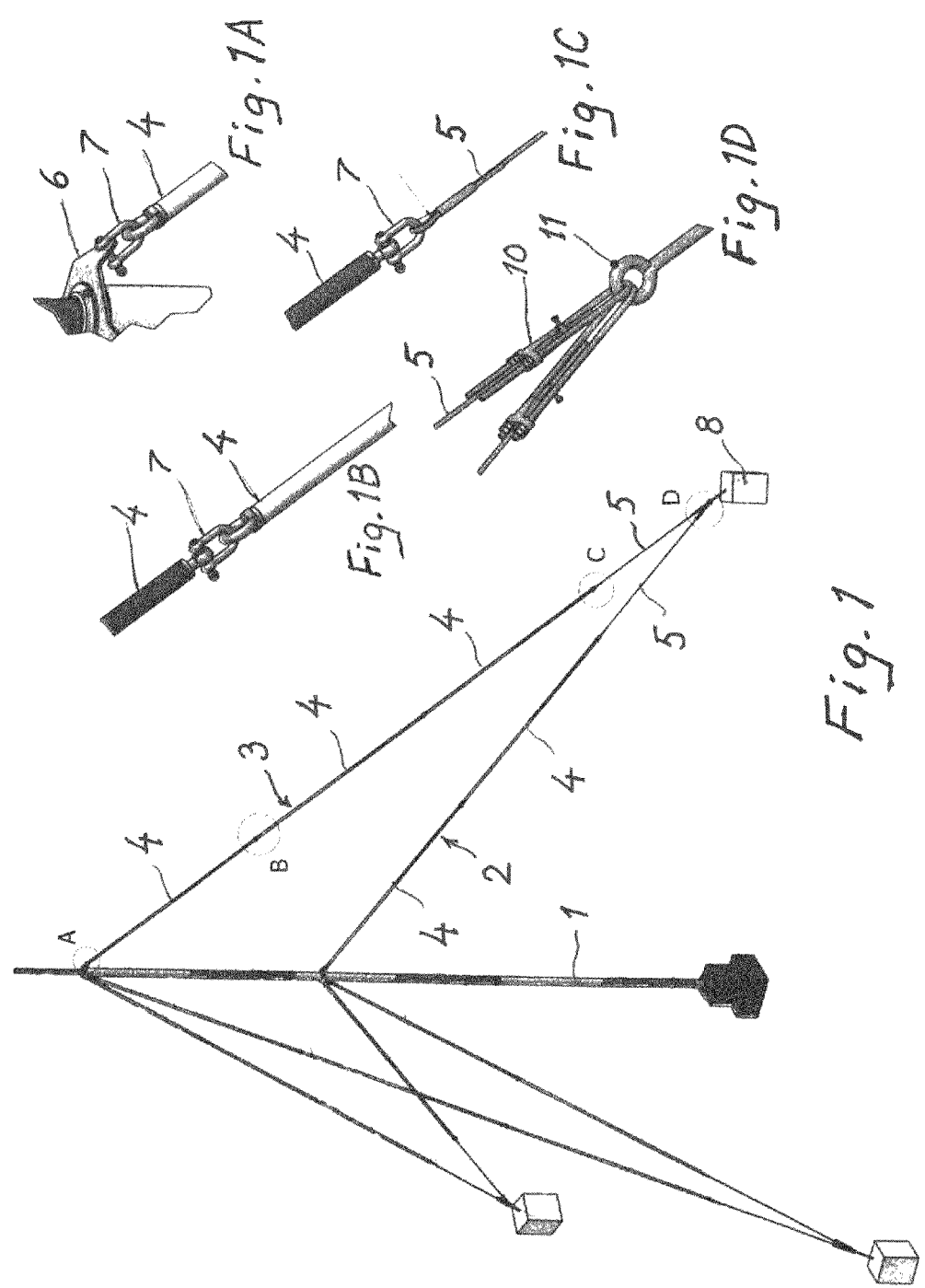

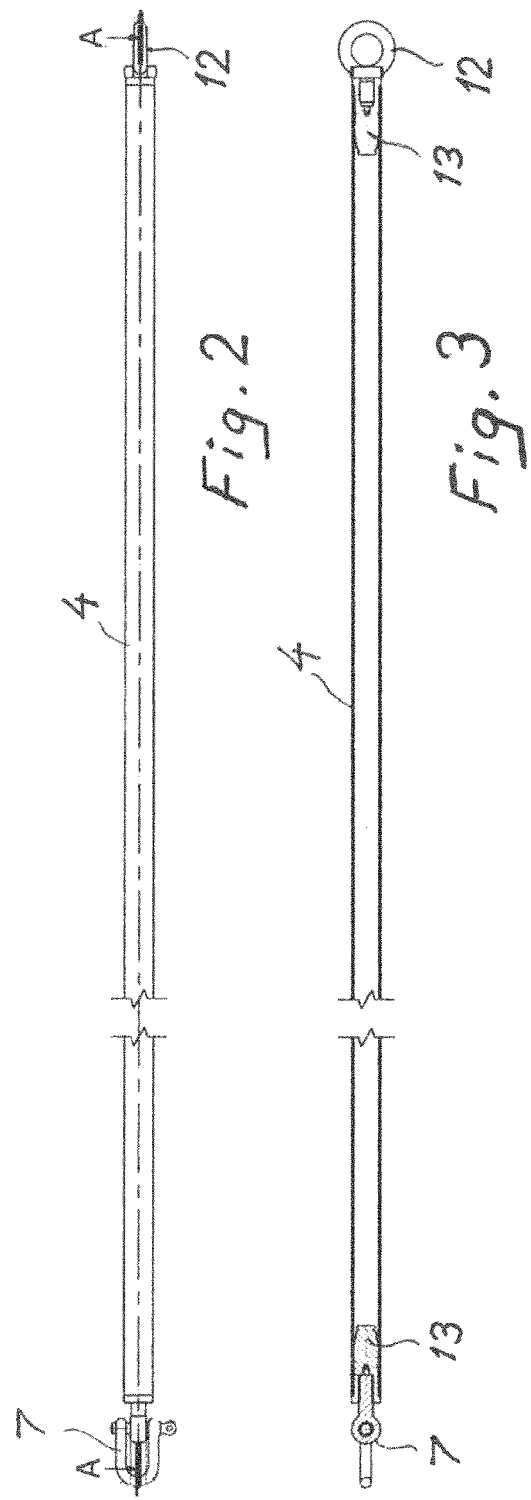

FRANGIBLE GUY WIRE OF AN AIRPORT MAST

The object of the invention is a frangible guy wire of an airport mast, which breaks on impact without presenting a hazard or causing critical damage to the object impacting with it.

It is known that airport masts are manufactured of composite tubes, wherein fibreglass is used as the reinforcement. The aim is to produce a light-weight mast, which is easily frangible on impact, in order to prevent the mast from presenting a hazard or causing critical damage in the event of impact with an aircraft. The ICAO Design Manual, Part 6, specifies that the failure mode of the support structure should be fracture, windowing or bending. Fracturing guy wires, that is, breaking into pieces, is new invention as currently used known guyed mast's breaking mechanism is based on windowing. Steel or other guy wires are typically used, when the breaking mechanism of the guy is based on the specific break away points of the guy wire in the middle and in the base.

The aim of the invention is to provide an improved guy structure of composite material, based on fracture breaking mechanism, which means that the guy can be used, for example, for demanding applications requiring ICAO or FAA certification.

This aim is achieved on the basis of the characteristics disclosed in the accompanying claim 1. The dependent claims disclose preferred embodiments of the invention.

The guy wire according to the invention is, therefore, a tube or tubular profile made of composite material, which upon impact fragments into several components, and the mass of these components should be as low as possible, and their manner of release should not cause a secondary hazard the aircraft (e.g. to enter through the wind screen, fuselage, tail surfaces etc.), and not to present the kind of hazard, that guy wires made of steel or aluminium materials do.

The Invention is Illustrated in the Following with Reference to the Accompanying Drawings, in which:

FIG. 1 shows a perspective view of a guyed tubular mast, which can be used, for example, as an approach light mast or a weather mast for aircrafts.

FIGS. 1A to 1D show detailed enlargements of sections A to D of FIG. 1.

FIG. 2 shows, on a larger scale, the tubular part of the guy according to the invention, as seen from the side, and FIG. 3 shows a section of FIG. 2 along line AA.

In FIG. 1, a tubular airport mast 1 is braced with guys 2 and 3. The guys consist of six composite tubes 4, the colouring of which alternates between red and white. According to ICAO regulations, the colouring of support structures having a length exceeding 2 m must be alternately red and white, divided into seven parts. In the embodiment shown, the colour of the seventh part is determined by the top of the mast, which is painted in one colour at the guy attachment point. Guys 2 and 3 also comprise a short wire 5 close to the base of the guy. The top ends of the guys are fixed to the mast 1 by means of a guy flange 6, to which the top ends of the guys attach with shackles 7. Between the composite tubes 4 are shackles 7, and the bottom end of the lower composite tube 4 is connected to the wire 5 by means of a shackle 7. The wires 5 are, in turn, connected to an anchor bolt 11 by means of guy tighteners 10. The anchor bolt is fixed to a guy anchor 8.

FIGS. 2 and 3 show in greater detail the composite tube 4 used in guys 2 and 3. The length of the composite tube 4 may vary according to need. However, the main part of the length of the guy consists of tubes 4 made of composite materials. A tubular profile (e.g. C-profile) may alternatively also be used. What is essential is that the materials and the proportions of the dimensions of the tube, or tubular profile, are selected in such a way that, on impact, it will break by shattering, that is, by breaking into pieces. In this case, secondary fragments are formed, the size and mass of which are sufficiently small not to cause critical damage to an aircraft in the event of impact. The shackle 7 and the fastening eye 12 are fixed to the ends of the composite tube 4 by means of end inserts 13, which do not have to become detached on impact, since the tube material itself fractures (breaks into pieces). The shackles 7 and the fastening eyes 12 may be replaced with other types of attachment means with which the composite tubes 4 can be connected in succession to form a continuous guy which withstands pulling.

The wall thickness of the tube or tubular profile must be sufficiently thin to bring about fracturing. The wall thickness is typically within the range 1-3 mm, preferably within the range 1.5-2.5 mm. The diameter of the tube 4 is typically within the range 20-40 mm, preferably within the range 20-30 mm. The composite materials may be a fibreglass reinforcement and a thermosetting resin. The amount of reinforcement in the composite material may be greater than 35% of the weight. Typically, the amount of reinforcement is within the range 35-80% of the weight, preferably within the range 60-80% of the weight. The tube or tube profile used for the guy can be manufactured by means of the pulltrusion, pullwinding, co-winding, filament winding or prepreg method.

The breaking mechanism of the guy tube is based on both profile geometry and material behaviour. By means of the guideline values and tests disclosed above, a person skilled in the art will be able to find the required proportions of the dimensions and ratios of material components to provide the desired fracturing.

As a thermosetting matrix may be used, for example, polyester, vinyl ester, polyurethane, epoxy, acrylic or phenol. The fibre reinforcement may be comprised of continuous or short fibres.

The airport mast 1 is also made of composite material by means of the pultrusion or pullwinding method. It has a tubular shape and the proportions of the dimensions and materials of the tube have been selected in such a way that, in the event of impact, the mast will also break by fracturing. Especially the wall thickness should be thin with respect to the diameter. Such dimensioning is possible when the mast is sufficiently braced with guy wires.

The invention claimed is:

1. A support that functions as a guy wire for bracing an airport mast, wherein the support consists of tubular profiles made of composite material, means for connecting the tubular profiles in succession, and means for connecting the tubular profiles to the ground and to an airport mast, and wherein the tubular profiles are configured to break into pieces in the event of an impact.

2. The support that functions as a guy wire as claimed in claim 1, wherein the tubular profiles have a wall thickness configured to achieve a desired fracturing.

3. The support that functions as a guy wire as claimed in claim 1, wherein the composite materials are a fibreglass reinforcement and a thermoplastic matrix, and the amount of fibreglass reinforcement is 35-80% by weight of the composite material.

4. The support that functions as a guy wire as claimed in claim 1, wherein the support has at least six composite tubular profiles, and wherein the means for connecting the tubular profiles in succession are shackles and fastening eyes.

5. The support that functions as a guy wire as claimed in claim 1, wherein the tubular profiles are manufactured by one of the following methods from the group consisting of: pultrusion, pullwinding, co-winding, filament winding or prepreg method.

6. An airport mast made of composite material, wherein the mast is supported by the support as claimed in claim 1, and
   wherein the mast is made of composite material, and
   wherein the mast is configured to break into pieces in the event of an impact.

\* \* \* \* \*